US006525332B1

United States Patent
Chang et al.

(10) Patent No.: US 6,525,332 B1
(45) Date of Patent: Feb. 25, 2003

(54) METHOD FOR DETECTING AND COMPENSATING DISK TILT AND APPARATUS USED IT

(75) Inventors: Hung-Lu Chang, Taichung (TW); Ming-Feng Ho, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/472,748

(22) Filed: Dec. 27, 1999

(30) Foreign Application Priority Data

Jun. 5, 1999 (TW) .......................................... 88109350 A

(51) Int. Cl.[7] .............................................. G01N 21/86
(52) U.S. Cl. .............................. 250/559.37; 250/206.1; 369/53.19
(58) Field of Search ...................... 250/559.37, 201.1, 250/201.5, 206.2, 206.3, 214 C, 234, 206.1, 568, 570; 356/139.1; 369/44.22, 44.41, 44.32, 53.19

(56) References Cited

U.S. PATENT DOCUMENTS

| | | | | | |
|---|---|---|---|---|---|
| 4,198,657 A | * | 4/1980 | Kanamaru | ............... | 369/44.22 |
| 4,658,489 A | * | 4/1987 | Kuehn | ..................... | 369/44.13 |
| 5,065,380 A | * | 11/1991 | Yokota | ..................... | 369/44.12 |
| 5,235,574 A | * | 8/1993 | Aviles et al. | ............ | 369/53.19 |
| 5,322,993 A | * | 6/1994 | Ohyama | ..................... | 369/118 |
| 5,751,680 A | * | 5/1998 | Ishibashi et al. | ......... | 369/44.32 |

* cited by examiner

*Primary Examiner*—Que T. Le
*Assistant Examiner*—Thanh X. Luu
(74) *Attorney, Agent, or Firm*—W. Wayne Liauh

(57) ABSTRACT

This invention relates to a method for detecting and compensating the disk tilt of an optical disk and an apparatus using it. The disk tilt causes the coma which degrades the carrier-to-signal ratio of a pickup. To reduce the coma induced by the disk tilt of an optical disk, the pickup of the present invention adapts a two-dimension (2-D) grating to produce a plurality of laser beams for detecting the disk tilt in the radial and tangential direction of the optical disk. In addition, according to the radial and tangential tilts of the disk, an actuation device adjusts a reflection angle of a reflective mean to change the incident angles of the laser beams for the compensation of the coma induced by the disk tilt of the optical disk.

15 Claims, 9 Drawing Sheets

METHOD FOR DETECTING AND COMPENSATING DISK TILT AND APPARATUS USED IT

FIELD OF THE INVENTION

The present invention relates to a method and an apparatus for detecting and compensating disk tilt, more particular to a technique for pickups to solve the reading-error problem induced by coma as there are optical disk tilts in the radial and tangential directions.

BACKGROUND OF THE INVENTION

Optical disks include a transparent substrate having a recording layer where data is recorded and stored. Data can be stored on the recording layer in various forms, including pits, marks, and magneto-optic domains. In an optical disk system, a laser beam is focused by an objective lens through the transparent substrate and onto the stored data. The laser beam is then reflected back through the same objective lens for focusing. Since surface defects on the disk, such as dust particles and scratches, can have dimensions on the order of the focused spot size of the laser beam, the laser beam is typically focused onto the rear surface of the disk substrate to ensure that any surface defects will be out of focus with respect to the recording layer containing the data. Any spherical aberration caused by focusing the laser beam through the substrate will generally be corrected by the design of the objective lens.

Typically, the optical disk is not perfectly flat, and any local deviations from flatness appear as a slight tilt of the front surface of the disk with respect to the incident beam. In addition, when the optical disk placed on a turntable of a player is warped, the front surface of the disk is tilted relative to the optical axis of the focused laser beam, and coma aberration occurs. Additional tilt components can be caused by spindle misalignment or disk droop. The disk tilt causes a degradation of the focused spot quality of the laser beam, which results in a decrease in the carrier-to-noise ratio during readout, an increase in crosstalk and intersymbol interference, and a reduction in recording sensitivity.

Future generations of optical disks will most likely utilize shorter wavelengths and higher numerical aperture objective lenses, both of which increase the area data density of the disks. Unfortunately, the sensitivity to disk tilt increases if the wavelength and numerical aperture quantities are adjusted to meet a higher data density. Several systems have been proposed that attempt to dynamically correct for the effects of disk tilt, for example, by tilting the objective lens or the entire optical head.

As a prior art, U.S. Pat. No. 5,065,380 discloses a tilt-detection method by adapting a pickup with three laser beams in the radial direction of an optical disk. The method measures only the radial tilt but not the tangential tilt, and it can not resist the tracking motion of the pickup.

U.S. Pat. No. 5,523,989 discloses another pickup with a tilt-compensation method which measures the disk tilt according to the push-pull signal (the interference between a zero-order diffracted light beam and +1, −1 first-order diffracted light beams reflected by the optical disk). The pickup compensates the coma by using a servo actuator. The pickup of the invention needs an additional lens and its size is larger than that of a traditional pickup.

Disclosed in U.S. Pat. No. 5,805,543, a method adapts two consecutive laser pulses to measure the disk tilt. Its calculation is too laborious to be realized on line. One type of tilt sensor measures tilt with respect to the disc surface, but only after the information beam is tracking and focused in an information track. Such systems are described in U.S. Pat. No. 5,206,848 to Kusano. Because these devices require relative stability between the optical recording actuator and the disc, they are ineffective for measuring inertial tilt during rapid actuator movements.

An apparatus for producing a tilt error signal representative of the tilt of an optical disk is disclosed in U.S. Pat. No. 5,805,543. The apparatus includes a source of laser beam for focusing a laser beam onto the disk and reflecting such beam from the disk, a beam splitter positioned to receive the reflected light beam and to direct the light beam in a first direction, and a structure for separating the reflected light beam from the beam splitter into at least four portions and for producing detection signals for each portion. The apparatus further includes circuitry responsive to the detection signals for producing first and second tracking error signals, the first and second tracking error signals being produced by different combinations of the detection signals and both being sensitive to cross-track diffraction, and circuitry responsive to the first and second tracking error signals for producing the tilt error signal. The apparatus has no actuator to compensate the disk tilt.

A combined sensor for measuring tilt and tracking position of a lens holder with respect to an optical recording actuator base is disclosed in U.S. Pat. No. 5,732,054. A light source and two photosensitive bi-cell detectors are secured to the actuator base so that a beam from the light source strikes the detectors, and an optical slot or flag is secured to the lens holder between the light source and the detectors, for creating an image on the bi-cell detectors. Output from the bi-cell detectors is converted into information on tilt and position of the lens holder relative to the actuator base.

SUMMARY OF THE INVENTION

The main objective of the invention is to provide a method and a pickup to detect the radial and tangential tilts of an optical disk and compensate the coma induced by the disk tilt. The pickup adapts a two-dimension (2-D) grating to produce a plurality of laser beams for detection. These laser beams include a zero-order (0-order) diffracted laser beam, +1, −1 first-order radial diffracted laser beams and +− first-order (+1-order and −1-order) tangential diffracted laser beams. In addition, two detectors are adapted in the pickup to measure the interference of the reflected laser beams corresponding to the radial and tangential tilts. According to the radial and tangential tilts of the disk, a reflective mean is controlled and actuated to change the incident angle of the reading laser beam of the pickup for the compensation of the coma induced by the disk tilt.

The other objective of the invention is to provide a simple actuator which adjusts the reflection angle of a reflective mean to change the incident angle of the reading laser beam of the pickup for the compensation of the coma induced by the disk tilt. The actuator includes piezoelectric driving devices or electromagnetic driving devices.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DETAILED DESCRIPTION OF THE PREFERRED EMBODIMENTS

Figure 1:
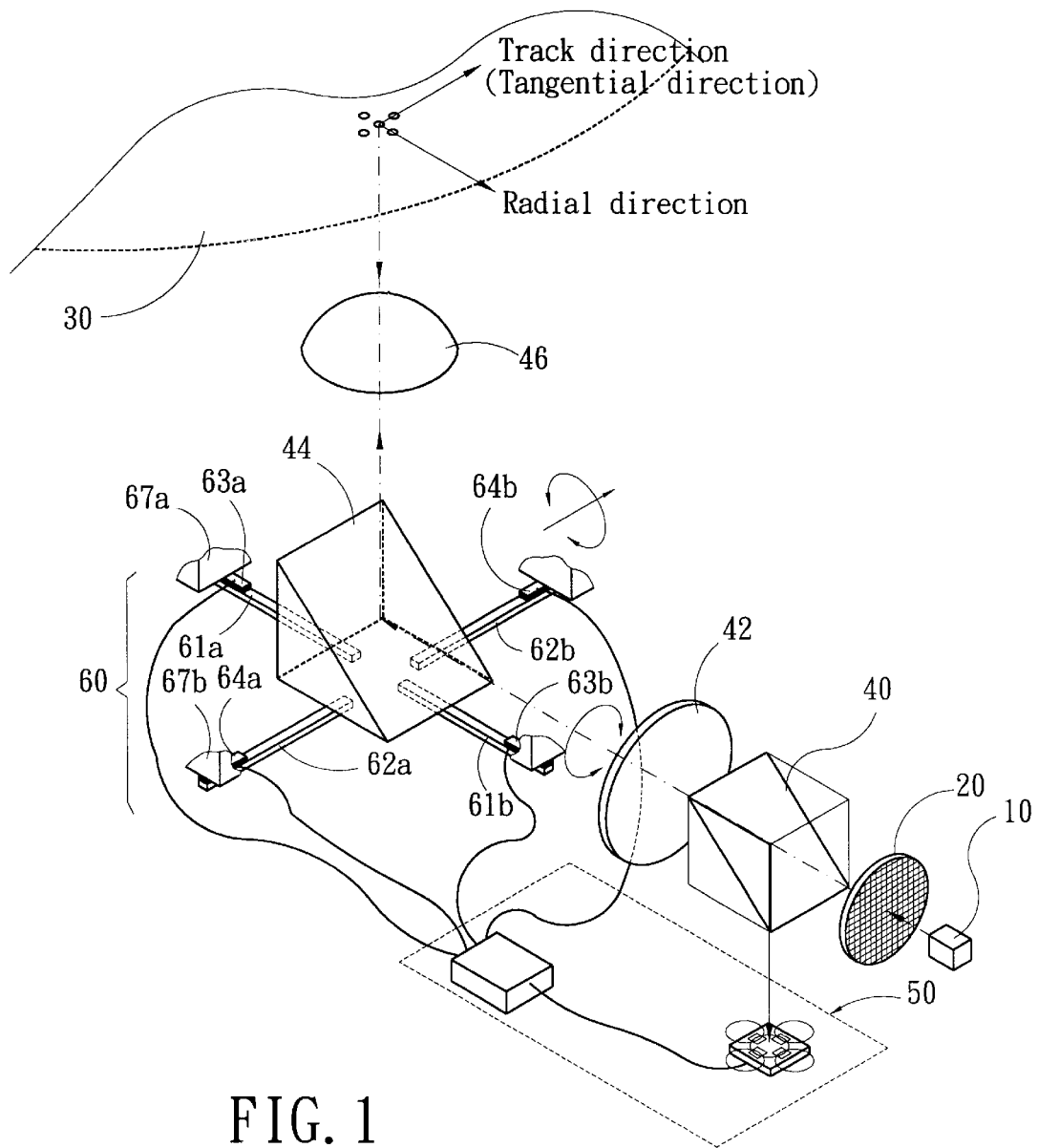
FIG. 1 is the perspective view of a pickup according to the present invention.

Referring to FIG. 1, according to the present invention, a pickup for the data access and the disk-tilt detection of an optical disk 30 includes a laser source 10, a two-dimension (2-D) grating 20, an optical system, a detection circuit 50 and an actuation device 60. The laser source 10 can generate a laser beam for the data access and the disk tilt detection such as a laser diode. The 2-D grating 20 diffracts the laser beam from the laser source 10 to a plurality of laser beams in the tangential and radial directions of the optical disk 30 for the disk-tilt detection. The optical system of the pickup according to the present invention includes a beam splitter 40, a collimator 42, a reflective device 44 and an objective lens 46 for the data access and the disk-tilt detection. The detection circuit 50 transfers the light intensity of the diffracted laser beams reflected from the optical disk 30 to the data signal recorded on the optical disk 30 and the tilt signals in the tangential and radial directions. According to the present invention, the actuation device 60 can adjust the reflection angle of the reflective device 44 to change the incident angle of any laser beam of the pickup which is focused onto the optical disk 30 for compensating the coma induced by the disk tilt.

The laser beam generated by the laser source 10 first travels through the 2-D grating 20. Then, the 2-D grating 20 diffracts the laser beam to a main laser beam and a plurality of minor laser beams. These laser beams sequentially travel through the beam splitter 40 and the collimator 42 collimating them. These collimated laser beams are then reflected to the objective lens 46 by the reflective device 44, and the objective lens 46 focuses them onto the optical disk 30 for the data access and disk-tilt detection. Next, these focused laser beams are reflected by the recording layer of the optical disk 30 and sequentially travel through the objective lens 46, the reflective device 44, the collimator 42 and the beam splitter 40 reflecting them onto a photo sensing device of the detection circuit 50. The detection circuit 50 transfers the light intensity of these backward laser beams to data signals recorded on the optical disk 30 and the tilt signals in the tangential and radial directions. According to the calculated tilt signals, the actuation device 60 tunes the reflection angle of the reflective device 44 to change the incident angles of these focused laser beams onto the optical disk 30 for compensating the coma induced by the disk tilt.

It is noted that according to the present invention the method for detecting and compensating the disk tilt at least includes the following steps:

a. detecting the tilts of the optical disk 30 in the tangential and radial directions; and b. tuning the reflection angle of the reflective device 44 to change the incident angle of the focused laser beams onto the optical disk 30 according to the detected tilt signals.

Figure 2:
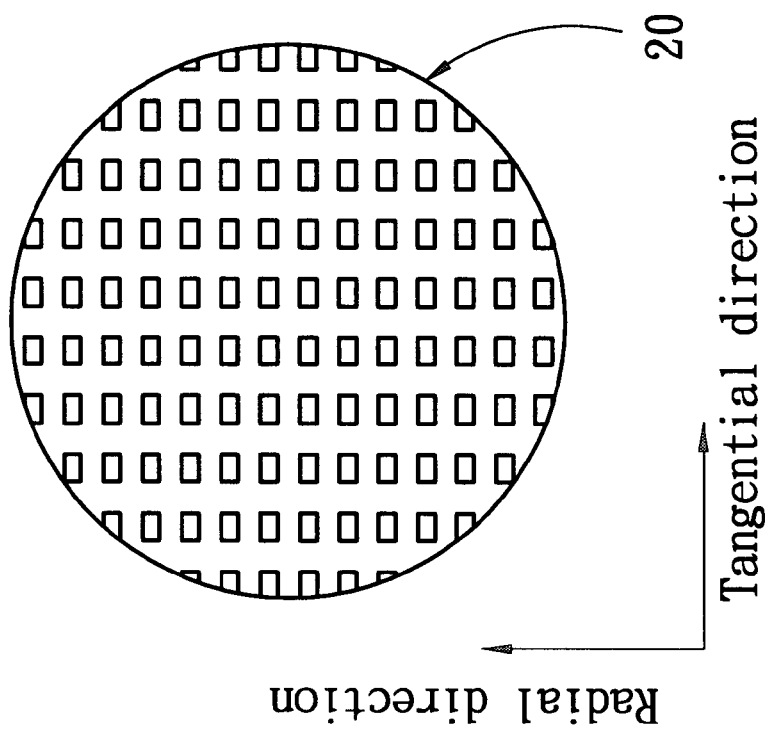
FIG. 2 is the top view of a two-dimension grating used in the pickup shown in FIG. 1.
Figure 3:
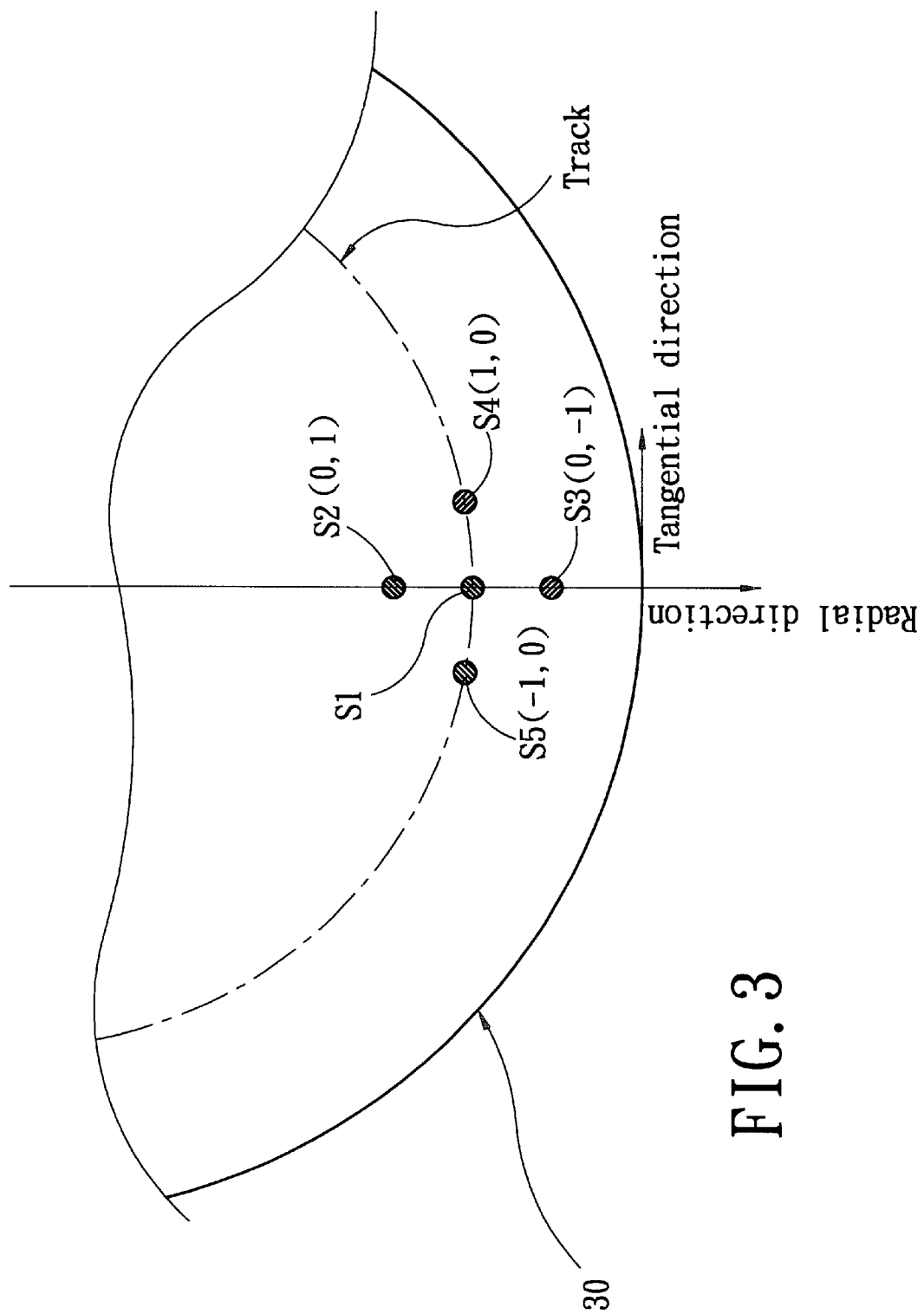
FIG. 3 shows the focused pattern of the laser beams diffracted by the grating shown in FIG. 2.

The 2-D grating 20 is defined by a plurality of straight lines where some straight lines are parallel to the radial direction and the residual straight lines are parallel to the tangential direction (i.e. the track direction of the optical disk 30) as shown in FIG. 2. The main laser beam diffracted by the 2-D grating is a zero-order diffracted laser beam, and the minor laser beams includes +1, −1 first-order diffracted laser beams in the radial direction and +1, −1 first-order diffracted laser beams in the tangential direction. These minor laser beams are symmetrically distributed corresponding to the main laser beam. The focused pattern of the main and minor laser beams on the optical disk 30 is shown in FIG. 3, and they are denoted by S1 to S5 (the numbers inside the quotations present the order of two dimensional diffraction).

Figure 4A:
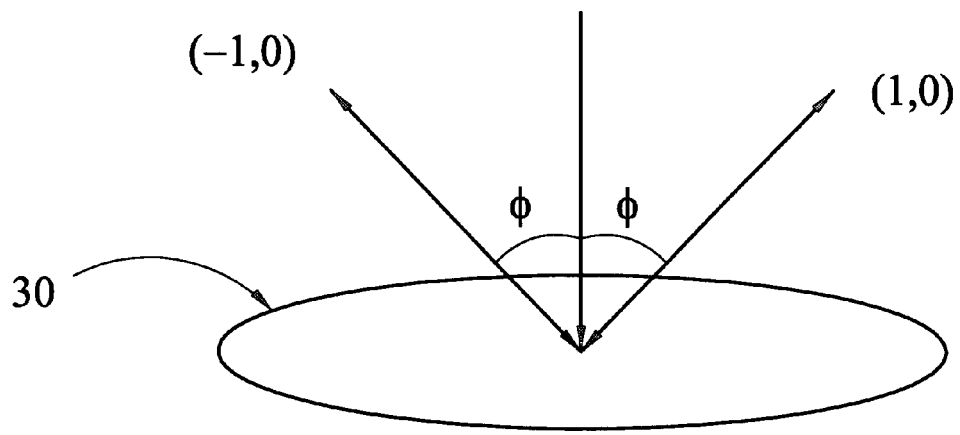
FIG. 4A illustrates the incident angle of the laser beam focused onto the optical disk according to the pickup of the present invention without disk tilt.
Figure 4B:
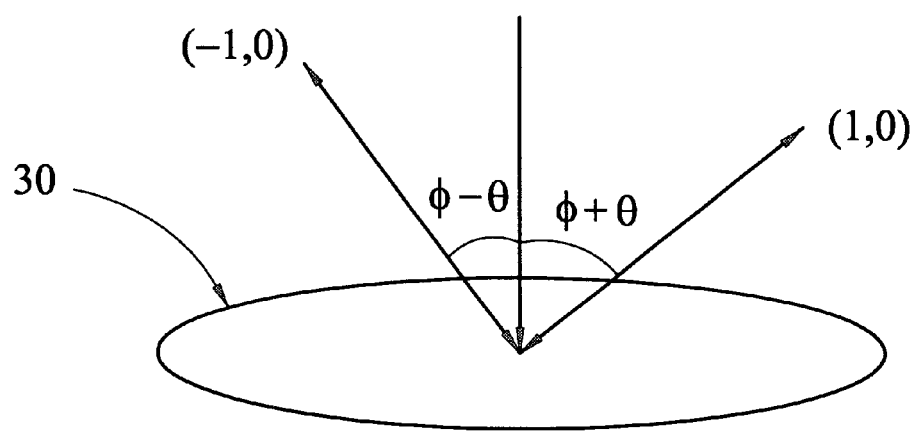
FIG. 4B illustrates the incident angle of the laser beam focused onto the optical disk according to the pickup of the present invention with disk tilt.
Figure 5A:
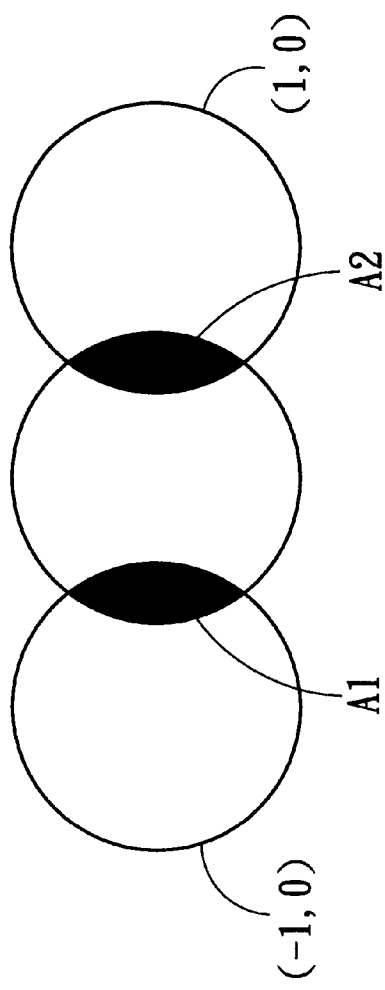
FIG. 5A illustrates the energy distribution of the diffracted laser beam reflected from the optical disk according to the pickup of the present invention without disk tilt.
Figure 5B:
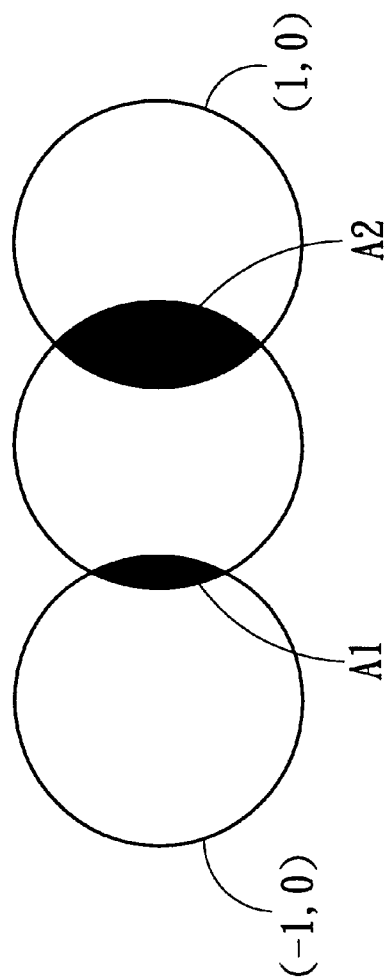
FIG. 5B illustrates the energy distribution of the diffracted laser beam reflected from the optical disk according to the pickup of the present invention with disk tilt.

Please refer to FIGS. 4A and 5A. As there exists no disk tilt induced by the optical disk 30, the incident angles of every +1-order diffracted laser beam and −1-order diffracted laser beam are equal (denoted by $\phi$). The light-intensity distribution on the photo sensing device of the laser beams reflected from the optical disk is schematically presented by the dark areas A1 and A2, and the A1's and A2's areas are equal (A1=A2). Referring to FIGS. 4B and 5B, as there exists a tilt angle $\theta$ on the optical disk 30, the incident angles of the +1-order diffracted laser beam and −1-order diffracted laser beam are $\phi-\theta$ and $\phi+\theta$. In addition, the light-intensity distribution on the photo sensing device of the laser beams reflected from the optical disk is schematically presented by the dark areas A1 and A2, and the A1's and A2's areas are different (A1≠A2). Consequently, according to the difference of the areas A1 and A2, the photo sensing device of the detection circuit 50 can measure the tilt angles of the optical disk 30 in the radial and tangential directions.

Figure 6:
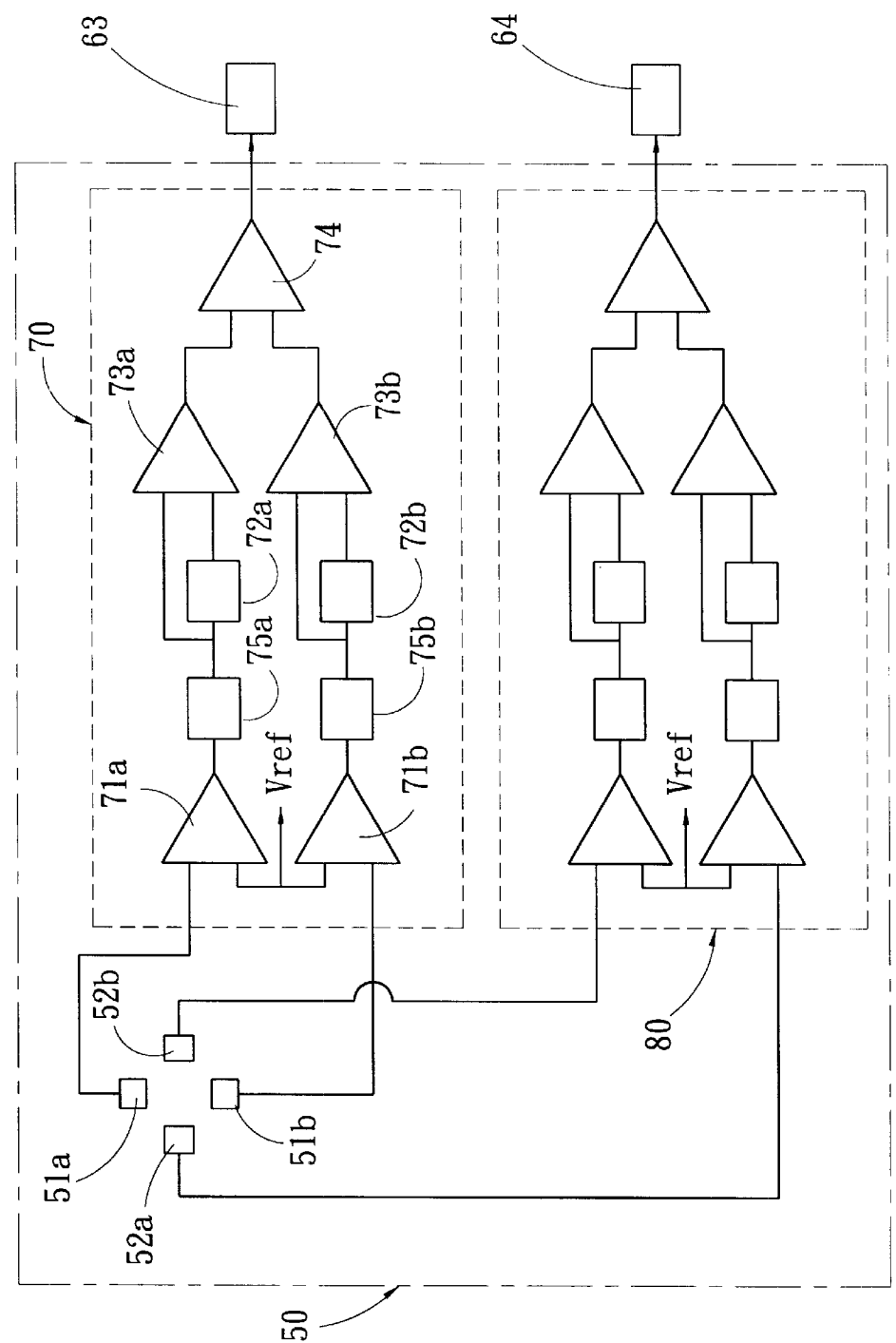
FIG. 6 is the diagram of the detection circuit of the pickup according to the present invention.
Figure 7:
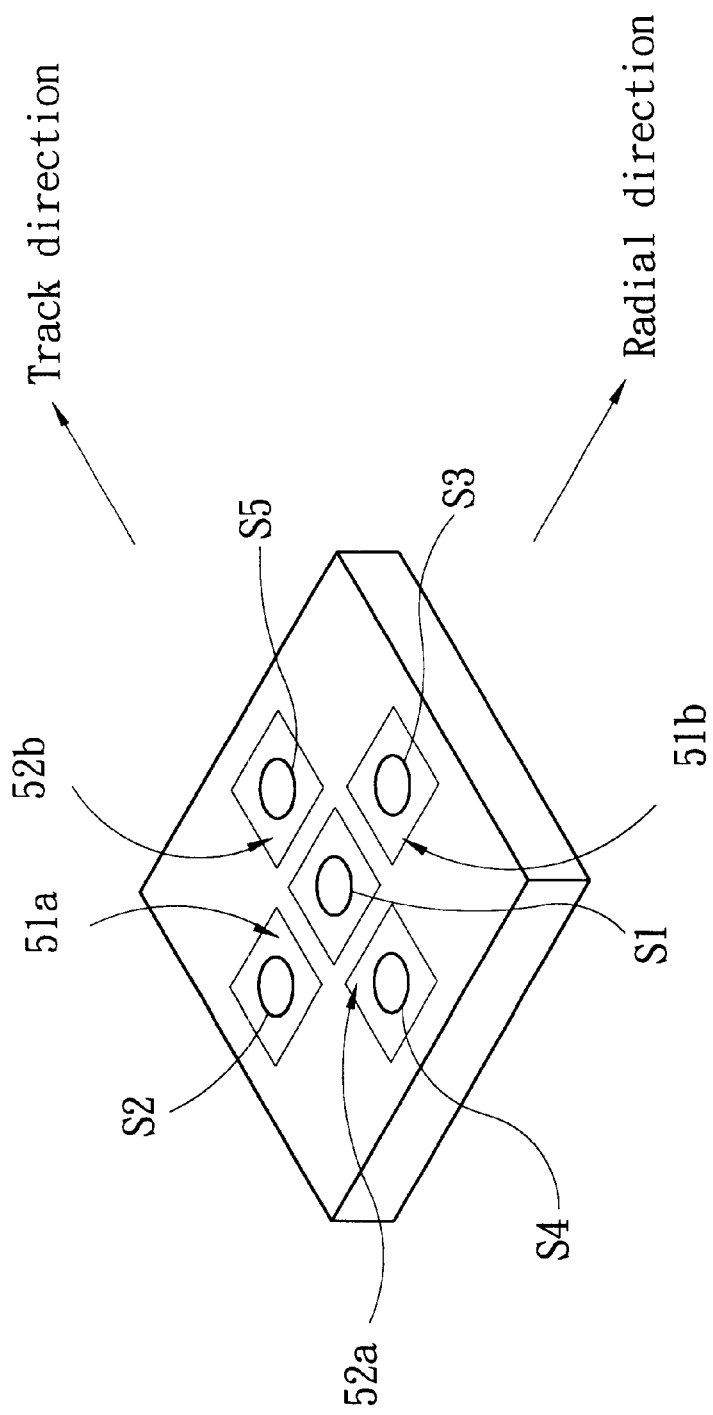
FIG. 7 illustrates the location relation of the detector and the diffracted laser spots according to the present invention.

Referring to FIGS. 6 and 7, the detection circuit 50 includes a photo sensing device having a first pair of photo sensors (51a and 51b) and a second pair of photo sensors (52a and 52b), a radial-tilt detection circuit 70 and a tangential-tilt detection circuit 80. The photo sensors 51a and 51b respectively transfer the light intensities of the reflected +1-order and −1-order laser beams S2 and S3 in the radial direction of the optical disk 30 to a first and a second electrical signals which are used to calculate the radial tilt. Similarly, the photo sensors 52a and 52b respectively transfer the light intensities of the reflected +1-order and −1-order laser beams S4 and S5 in the tangential direction of the optical disk 30 to a third and a forth electrical signals which are used to calculate the tangential tilt. The radial-tilt detection circuit 70 calculates the difference of the first and second electrical signals and exports a radial-tilt signal. Similarly, the tangential-tilt detection circuit 80 calculates the difference of the third and forth electrical signals and exports a tangential-tilt signal.

As the tracking motion of the pickup is operated, the objective lens 46 is moved along the radial direction of the optical disk 30. The radial motion of the objective lens 46 greatly affects the radial-tilt signal of the detection circuit 50, and insignificantly influences the tangential-tilt signal. In order to reduce the influence of the tracking motion of the pickup, signal process is required in the radial-tilt detection circuit 70. Since the radial-tilt signal is modulated by the tracking error signal caused by the disk run-out and the frequency is higher than the moving frequency of the objective lens 46 and tilt signal, the influence of tracking motion of the pickup can be reduced with filters. To reduce the influence of the tracking motion of the pickup, the radial-tilt detection circuit 70 includes two amplifiers (71a and 71b), two first processing circuits (75a and 75b) including a first low-pass filter and a demodulator circuit with cut-off frequency F1, two second low-pass filters (72a and 72b) with cut-off frequency F2, two differentiators (73a and 73b) and a differentiator 74, where the cut-off frequency F1 is higher than the cut-off frequency F2. The amplifiers 71a and 71b are used to amplify the first and second electrical signals from the first pair of photo sensors, respectively. The amplified signal of the first and second electrical signals is then respectively transported to the first processing circuits 75a and 75b. The first processing circuit 75a processes amplified signal of the first electrical signal and filters out the signal induced by the run-out motion of the rotated optical disk 30 in the radial direction and infested in the first electrical signal. The first processing circuit 75a then exports the processed signal to the second low-pass filter 72a. The low-pass filters 72a and 72b filter out the signal induced by the movement of the objective lens 46 and infested in the amplified and filtered signals. The filtered signal of the first electrical signal is differentiated by its amplified signal in the differentiator 73a, and similarly, the filtered signal of the second electrical signal is differentiated by its amplified signal in the differentiator 73b. The differentiator 74 calculates the difference of both differentiated signals imported from the differentiator 73a and 73b, and exports the radial-tilt signal. In addition, the circuitry of the tangential-tilt circuit 80 is similar to that of the radial-tilt circuit 70 as shown in FIG. 6.

Hence, in order to reduce the coma induced by the disk tilt, the laser beam of the pickup must be orthogonally focused on to the optical disk 30, in other word, the incident angle of the focused laser beam is zero. It is the function of the actuation device 60, which adjusts the reflection angle of the reflective device 44 to make the incident angle of the focused laser beam zero according to the tilt angles of the optical disk 30.

Figure 8:
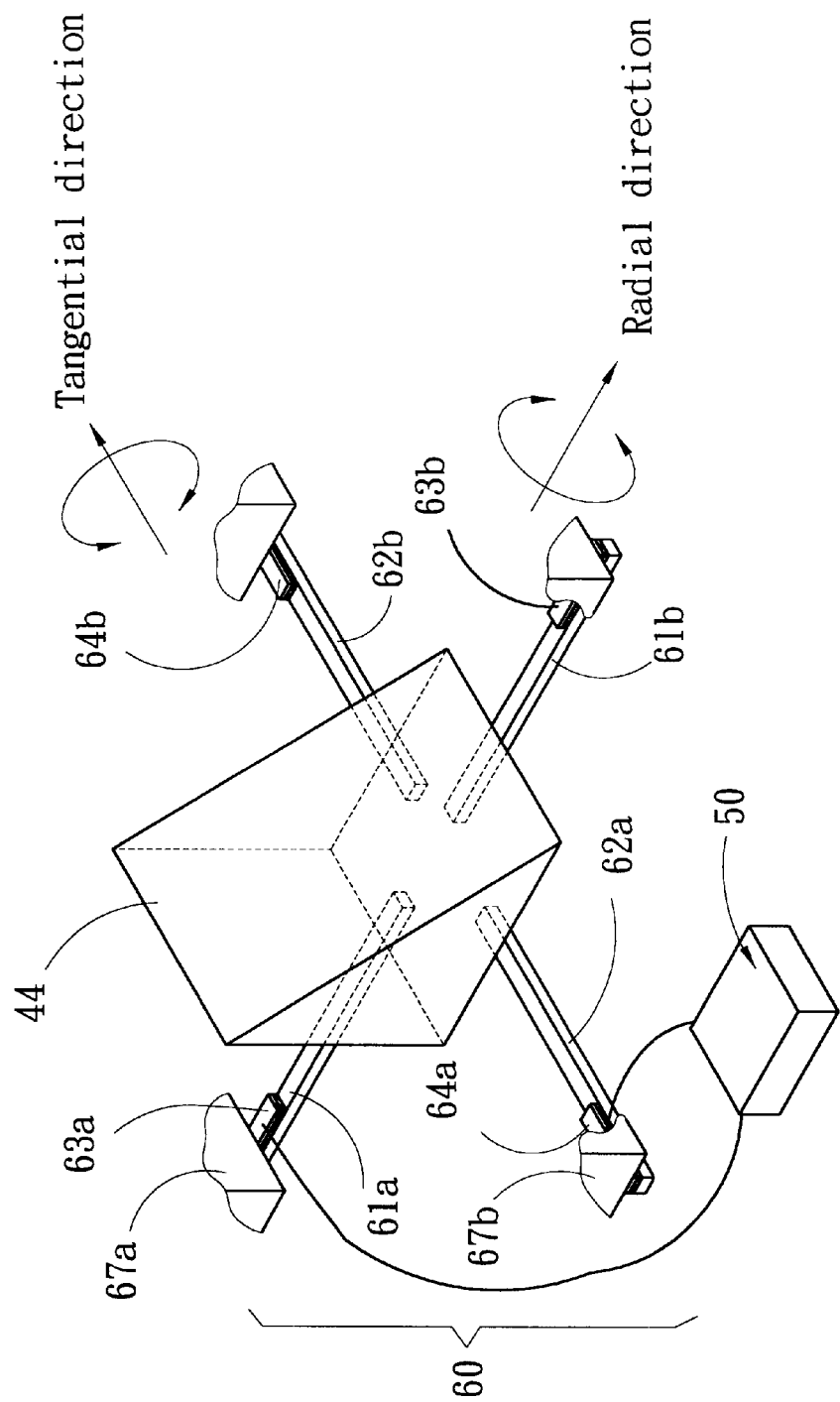
FIG. 8 is an embodiment of the actuation device of the pickup according to the present invention, which is used to compensate the coma induced by the disk tilt.

In FIG. 8, an embodiment of the actuation device 60 is shown. The coma induced by the disk tilt can be reduced by rotating the reflective device 44 along the radial or tangential directions. The reflective device 44 of the invention can be a mirror or a 45° prism, and it is supported by the free ends of a plurality of rods 61a, 61b, 62a and 62b arranged along the radial and tangential directions. The other ends of these rods 61a, 61b, 62a and 62b are fixed. The actuation device 60 includes a first pair of piezoelectric actuators (63a and 63b) and a second pair of piezoelectric actuators (64a and 64b). The first pair of piezoelectric actuators 63a and 63b are respectively disposed at the fixed ends of the rods 61a and 61b on one surface, and the other surface of each piezoelectric actuator is rigidly mounted on a base 67a. Similarly, the second pair of piezoelectric actuators 64a and 64b are respectively disposed at the fixed ends of the rods 62a and 62b on one surface, and the other surface of each piezoelectric actuator is rigidly mounted on a base 67b. According to the radial-tilt signal exported by the detection circuit 50, the first pair of piezoelectric actuators 63a and 63b are excited to bend the rods 61a and 61b to rotate the reflective device 44 with its rotation axis parallel to the tangential direction. Similarly, according to the tangential-tilt signal exported by the detection circuit 50, the second pair of piezoelectric actuators 64a and 64b are excited to bend the rods 62a and 62b to rotate the reflective device 44 with its rotation axis parallel to the radial direction. Since the tilt angles are generally very small about 0.5 to 0.6 degrees, the piezoelectric actuators are suitable for this objective.

Figure 9:
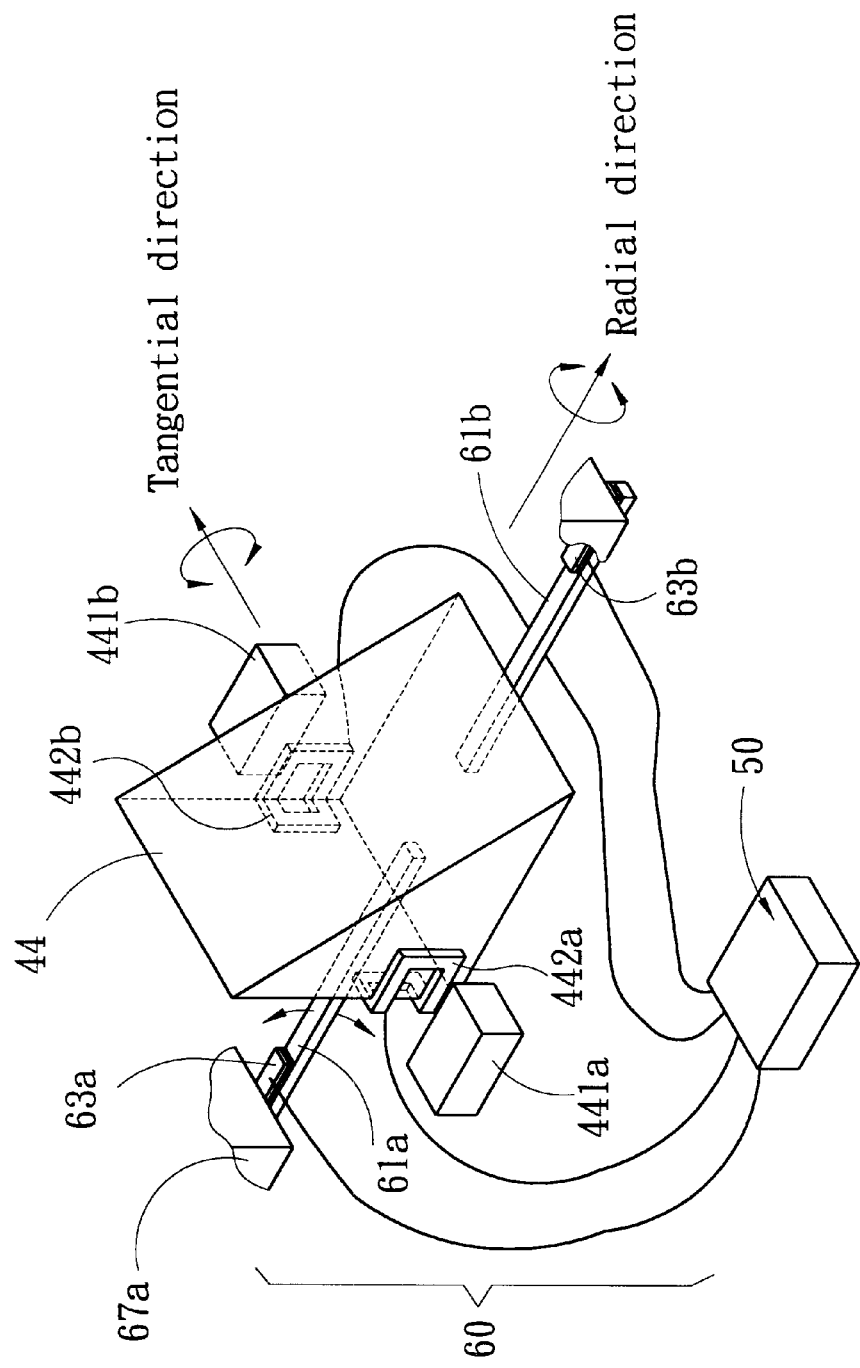
FIG. 9 is another embodiment of the actuation device of the pickup according to the present invention.

FIG. 9 shows another embodiment of an actuation device 60a of the invention. In this embodiment, a pair of electromagnetic actuators 65 and 66 are used to replace the second pair of piezoelectric actuators 64a and 64b of the first embodiment. These electromagnetic actuators 65 and 66 can be constructed by voice coils (442a and 442b) and permanent magnets 441a and 441b, respectively. The electromagnetic actuators 65 and 66 are disposed on two opposite side walls of the reflective device 44. By exciting the voice coils 442a and 442b to generate magnetic forces, the reflective device 44 can be rotated with its rotation axis parallel to the radial direction.

It is noted that method and apparatus for detecting and compensating disk tilt described above are the preferred embodiments of the present invention for the purposes of illustration only, and are not intended as a definition of the limits and scope of the invention disclosed. Any modifications and variations that may be apparent to a person skilled in the art are intended to be included within the scope of the present invention.

What is claimed is:

1. An apparatus for detecting and compensating the disk tilt of an optical disk by adjusting the incident angle onto said optical disk of an incident laser beam generated from a laser source, comprising:

a two-dimensional grating for diffracting said incident laser beam to a main laser beam and a plurality of minor laser beams, said two-dimensional grating is constructed such that said minor laser beams contain diffracted laser beams that are parallel to a radial direction of the optical disk and diffracted laser beams that are parallel to a tangential direction of the optical disk;

a detection circuit for transferring the light intensities of said main and minor laser beams reflected from said optical disk to a radial-tilt signal denoting the radial tilt of said optical disk and a tangential-tilt signal denoting the tangential tilt of said optical disk;

a reflective device for reflecting said main and minor laser beams to said optical disk and being able to tilt by rotating along the radial and tangential directions of said optical disk; and an actuation device for tilting said reflective device so as to change the incident angles of said main and minor laser beams according to said radial-tilt signal and said tangential-tilt signal;

wherein said main laser beam is a zero-order diffracted laser beam, and said minor laser beams include a +1 first-order diffracted laser beam and a −1 first-order diffracted laser beam in the radial direction and a +1 first-order diffracted laser beam and a −1 first-order diffracted laser beam in the tangential direction.

2. The apparatus for detecting and compensating the disk tilt of an optical disk as claimed in claim 1 wherein said two-dimensional grating is defined by a plurality of straight lines parallel to the radial direction of said optical disk and a plurality of straight lines parallel to the tangential direction of said optical disk.

3. The apparatus for detecting and compensating the disk tilt of an optical disk as claimed in claim 1 wherein said detection circuit includes a first pair of photo sensors transferring said minor laser beams in the radial direction of said optical disk to electrical signals, a second pair of photo sensors transferring said minor laser beams in the tangential direction of said optical disk to electrical signals, a radial-tilt detection circuit exporting said radial-tilt signal according to said electrical signals from said first pair of photo sensors and a tangential-tilt detection circuit exporting said tangential-tilt signal according to said electrical signals from said second pair of photo sensors.

4. The apparatus for detecting and compensating the disk tilt of an optical disk as claimed in claim 3 wherein said radial-tilt detection circuit includes a low-pass filter, a demodulator circuit and a differentiator.

5. The apparatus for detecting and compensating the disk tilt of an optical disk as claimed in claim 3 wherein said tangential-tilt detection circuit includes a low-pass filter, a demodulator circuit and a differentiator.

6. The apparatus for detecting and compensating the disk tilt of an optical disk as claimed in claim 1 wherein said reflective device is a mirror.

7. The apparatus for detecting and compensating the disk tilt of an optical disk as claimed in claim 1 wherein said reflective device is a 45° prism.

8. The apparatus for detecting and compensating the disk tilt of an optical disk as claimed in claim 1 wherein said reflective device is supported by the free ends of a plurality of rods which are arranged in the radial and tangential directions of said optical disk and the other ends of them are fixed.

9. The apparatus for detecting and compensating the disk tilt of an optical disk as claimed in claim 8 wherein said actuation device includes a first pair of piezoelectric actuators and a second pair of piezoelectric actuators where said first pair of piezoelectric actuators are disposed at the fixed end of said rod and used to bend said rods to rotate said reflective device with the rotation axis parallel to the tangential direction of said optical disk according to said radial-tilt signal, and said second pair of piezoelectric actuators are disposed at the fixed end of said rods and used to bend said rods to rotate said reflective device with the rotation axis parallel to the radial direction of said optical disk according to said tangential-tilt signal.

10. The apparatus for detecting and compensating the disk tilt of an optical disk as claimed in claim 1 wherein said actuation device includes a pair of rods, a pair of piezoelectric actuators used to rotate said reflective device with a rotation axis parallel to the tangential direction of said optical disk, and a pair of electromagnetic actuators used to rotate said reflective device with a rotation axis parallel to the radial direction of said optical disk.

11. The apparatus for detecting and compensating the disk tilt of an optical disk as claimed in claim 10 wherein one end of said rod is fixed and the other end of said rod is free and used to support said reflective device; said piezoelectric actuator is disposed on the fixed of said rod; and according to said radial-tilt signal of said detection circuit, said piezoelectric actuator is used to bend said rod for rotating said reflective device with a rotation axis parallel to the tangential direction of said optical disk.

12. The apparatus for detecting and compensating the disk tilt of an optical disk as claimed in claim 10 wherein each one of said electromagnetic actuators disposed on two opposite side walls of said reflective device includes a voice coil and a permanent magnet; and according to said tangential-tilt signal of said detection circuit, each one of said electromagnetic actuators generates magnetic forces to rotate said reflective device with a rotation axis parallel to the radial direction of said optical disk.

13. A method for detecting and compensating the disk tilt of an optical disk by adopting a pickup including a laser source generating a laser beam, a reflective device and an objective lens to adjust the reflection angle of said reflective device for changing the incident angle onto said optical disk of said laser beam, comprising the following steps:

focusing said laser beam onto said optical disk and diffracting said laser beam to a zero-order diffracted laser beam, a first pair of +1 and −1 first-order diffracted laser beams symmetrically distributed in the radial direction of said optical disk corresponding to said zero-order diffracted laser beam and a second pair of +1 and −1 first-order diffracted laser beams symmetrically distributed in the tangential direction of said optical disk corresponding to said zero-order diffracted laser beam;

transferring the light intensities of said first pair of +1 and −1 first-order diffracted laser beams reflected from said optical disk to a first electrical signal and a second electrical signal;

transferring the light intensities of said second pair of +1 and −1 first-order diffracted laser beams reflected from said optical disk to a third electrical signal and a forth electrical signal;

calculating the difference of said first electrical signal and said second electrical signal as a radial-tilt signal;

calculating the difference of said third electrical signal and said forth electrical signal as a tangential-tilt signal;

according to said radial-tilt signal, rotating said reflective device with a rotation axis parallel to the tangential direction of said optical disk to change the incident angle onto said optical disk of said laser beam; and according to said tangential-tilt signal, tilting said reflective device with a rotation axis parallel to the radial direction of said optical disk to change the incident angle onto said optical disk of said laser beam.

14. The method for detecting and compensating the disk tilt of an optical disk as claimed in claim 13 wherein said step of calculating the difference of said first electrical signal and said second electrical signal further includes the following steps:

by using a first low-pass filter, processing said first electrical signal including a parasitic signal induced by the rotating run-out of said optical disk to filter said parasitic signal out as a first processed electrical signal;

by using a second low-pass filter, processing said first processed electrical signal including an infested signal induced by the movement of said objective lens to filter said infested signal out as a first filtered electrical signal;

by using a second low-pass filter, processing said second electrical signal including an infested signal induced by the movement of said objective lens to filter said infested signal out as a second filtered electrical signal;

by using a differentiator, differentiating said first filtered electrical signal with said first electrical signal as a first differentiating electrical signal;

by using a differentiator, differentiating said first filtered electrical signal with said second electrical signal as a second differentiating electrical signal;

by using a differentiator, calculating the difference of said first differentiating electrical signal and said second differentiating electrical signal as said radial-tilt signal.

15. The method for detecting and compensating the disk tilt of an optical disk as claimed in claim 13 wherein said step of calculating the difference of said third electrical signal and said forth electrical signal, includes the following steps:

by using a first low-pass filter, processing said third electrical signal including a parasitic signal induced by the rotating run-out of said optical disk to filter said parasitic signal out as a third processed electrical signal;

by using a second low-pass filter, processing said third processed electrical signal including an infested signal induced by the movement of said objective lens to filter said infested signal out as a third filtered electrical signal;

by using a second low-pass filter, processing said forth electrical signal including an infested signal induced by the movement of said objective lens to filter said infested signal out as a forth filtered electrical signal;

by using a differentiator, differentiating said third filtered electrical signal with said third electrical signal as a third differentiating electrical signal;

by using a differentiator, differentiating said fourth filtered electrical signal with said fourth electrical signal as a fourth differentiating electrical signal;

by using a differentiator, calculating the difference of said third differentiating electrical signal and said fourth differentiating electrical signal as said radial-tilt signal.

* * * * *